US007306064B2

(12) United States Patent
Imazu et al.

(10) Patent No.: US 7,306,064 B2
(45) Date of Patent: Dec. 11, 2007

(54) HYBRID TRANSMISSION AND MODE-SHIFT CONTROL FOR HYBRID VEHICLE

(75) Inventors: Tomoya Imazu, Yokohama (JP); Shinichiro Joe, Yokohama (JP); Michel Mensler, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 314 days.

(21) Appl. No.: 10/895,370

(22) Filed: Jul. 21, 2004

(65) Prior Publication Data

US 2005/0023055 A1 Feb. 3, 2005

(30) Foreign Application Priority Data

Jul. 30, 2003 (JP) ............................ 2003-203628

(51) Int. Cl.
*B60K 6/04* (2006.01)

(52) U.S. Cl. ...................... 180/65.2; 903/930; 903/946

(58) Field of Classification Search ............... 180/65.2, 180/65.3, 65.4; 903/930, 946; 477/5
See application file for complete search history.

(56) References Cited

U.S. PATENT DOCUMENTS 4,335,429 A * 6/1982 Kawakatsu ................. 701/102
5,285,111 A * 2/1994 Sherman ..................... 290/4 C
6,248,036 B1 * 6/2001 Masaki .......................... 475/2
6,299,563 B1 * 10/2001 Shimasaki ..................... 477/5
6,383,114 B1 * 5/2002 Hoshiya et al. ................ 477/2
6,478,705 B1 * 11/2002 Holmes et al. ................ 475/5
6,483,197 B1 * 11/2002 Masberg et al. .......... 290/40 C
6,857,985 B2 * 2/2005 Williams ....................... 477/5
6,886,648 B1 * 5/2005 Hata et al. ................. 180/65.2

FOREIGN PATENT DOCUMENTS

JP 2000-037004 A 2/2000
JP 2000-127775 A 5/2000
JP 2000-299904 A 10/2000
JP 2001-047882 A 2/2001
JP 2001-090826 A 4/2001
JP 2001-105908 A 4/2001
JP 2001-112113 A 4/2001
JP 2001-164960 A 6/2001
JP 2003-034153 A 2/2003
JP 2003-34154 A 2/2003
JP 2003-111205 A 4/2003

* cited by examiner

*Primary Examiner*—Frank Vanaman
(74) *Attorney, Agent, or Firm*—Foley & Lardner LLP

(57) ABSTRACT

A hybrid transmission for a hybrid vehicle mounting thereon an engine and a pair of electric motor/generators operates in a plurality of driving modes including EV mode in which the vehicle is powered by only the pair of motor/generators and EIVT mode in which the vehicle is powered by both the pair of motor/generators and the engine. The driving mode is shifted continuously and smoothly through a mode-shift transition process, in which the operating state is regulated to decrease the relative torque and/or the relative rotational speed between the contact elements of an engine clutch before engaging or disengaging the engine clutch.

10 Claims, 5 Drawing Sheets

ACCELERATOR OPENING SENSOR
VEHICLE SPEED SENSOR
ENGINE SPEED SENSOR
26
27
28
(APO)
(VSP)
(Ne)
HYBRID CONTROLLER
21
Te*
ENGINE CONTROLLER
22
ENG
ENGINE
T1*,T2*
MOTOR/ GENERATOR CONTROLLER
23
INVERTER
24
HYBRID TRANSMISSION
1
5
7
BATTERY
25
6

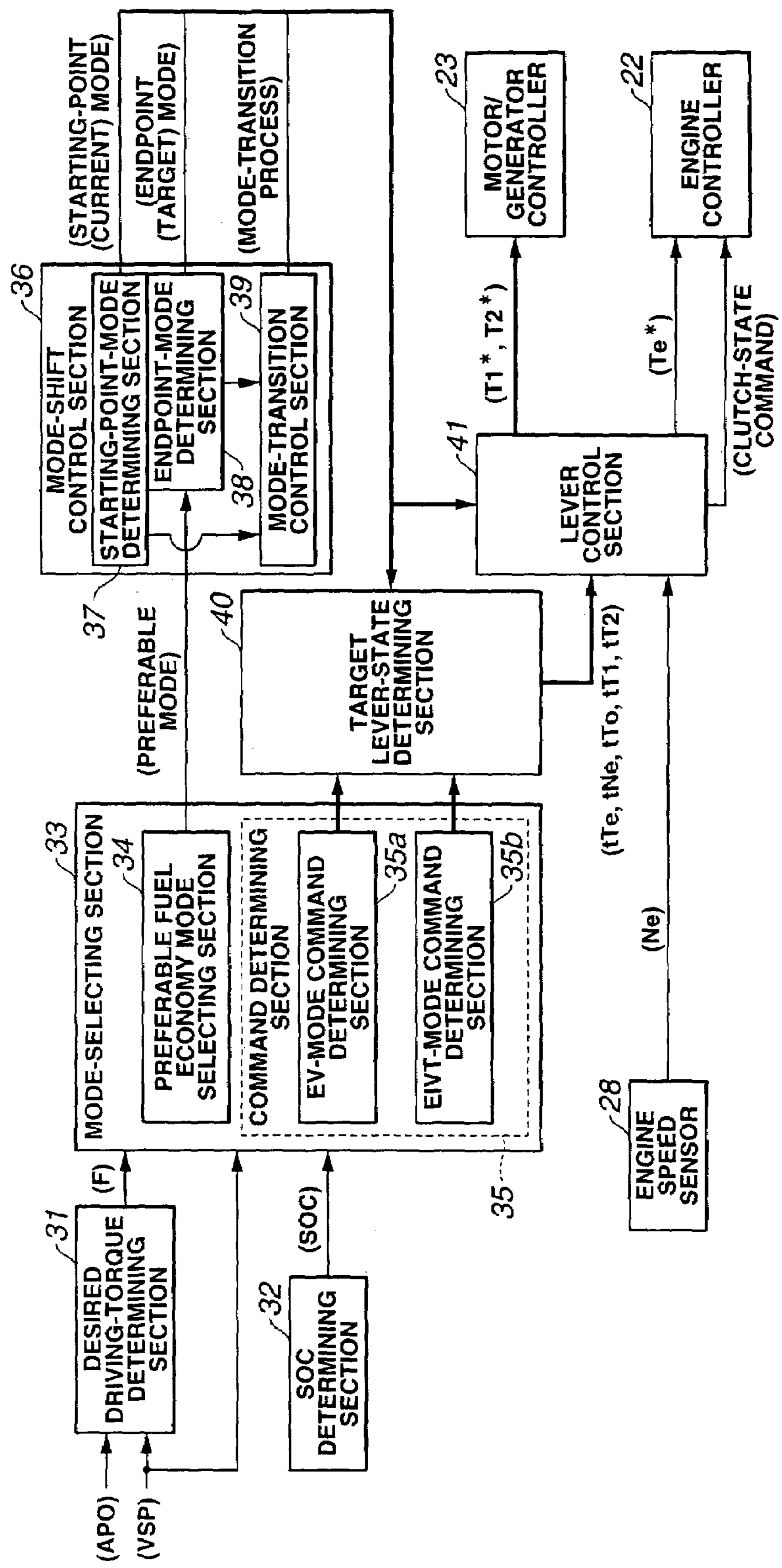
FIG.3
(APO)
(VSP)
31
DESIRED DRIVING-TORQUE DETERMINING SECTION
(F)
32
SOC DETERMINING SECTION
(SOC)
33
MODE-SELECTING SECTION
34
PREFERABLE FUEL ECONOMY MODE SELECTING SECTION
COMMAND DETERMINING SECTION
35
35a
EV-MODE COMMAND DETERMINING SECTION
35b
EIVT-MODE COMMAND DETERMINING SECTION
(PREFERABLE MODE)
40
TARGET LEVER-STATE DETERMINING SECTION
(tTe, tNe, tTo, tT1, tT2)
36
MODE-SHIFT CONTROL SECTION
37
STARTING-POINT-MODE DETERMINING SECTION
38
ENDPOINT-MODE DETERMINING SECTION
39
MODE-TRANSITION CONTROL SECTION
(STARTING-POINT (CURRENT) MODE)
(ENDPOINT (TARGET) MODE)
(MODE-TRANSITION PROCESS)
41
LEVER CONTROL SECTION
(T1*, T2*)
(Te*)
(CLUTCH-STATE COMMAND)
23
MOTOR/ GENERATOR CONTROLLER
22
ENGINE CONTROLLER
28
ENGINE SPEED SENSOR
(Ne)

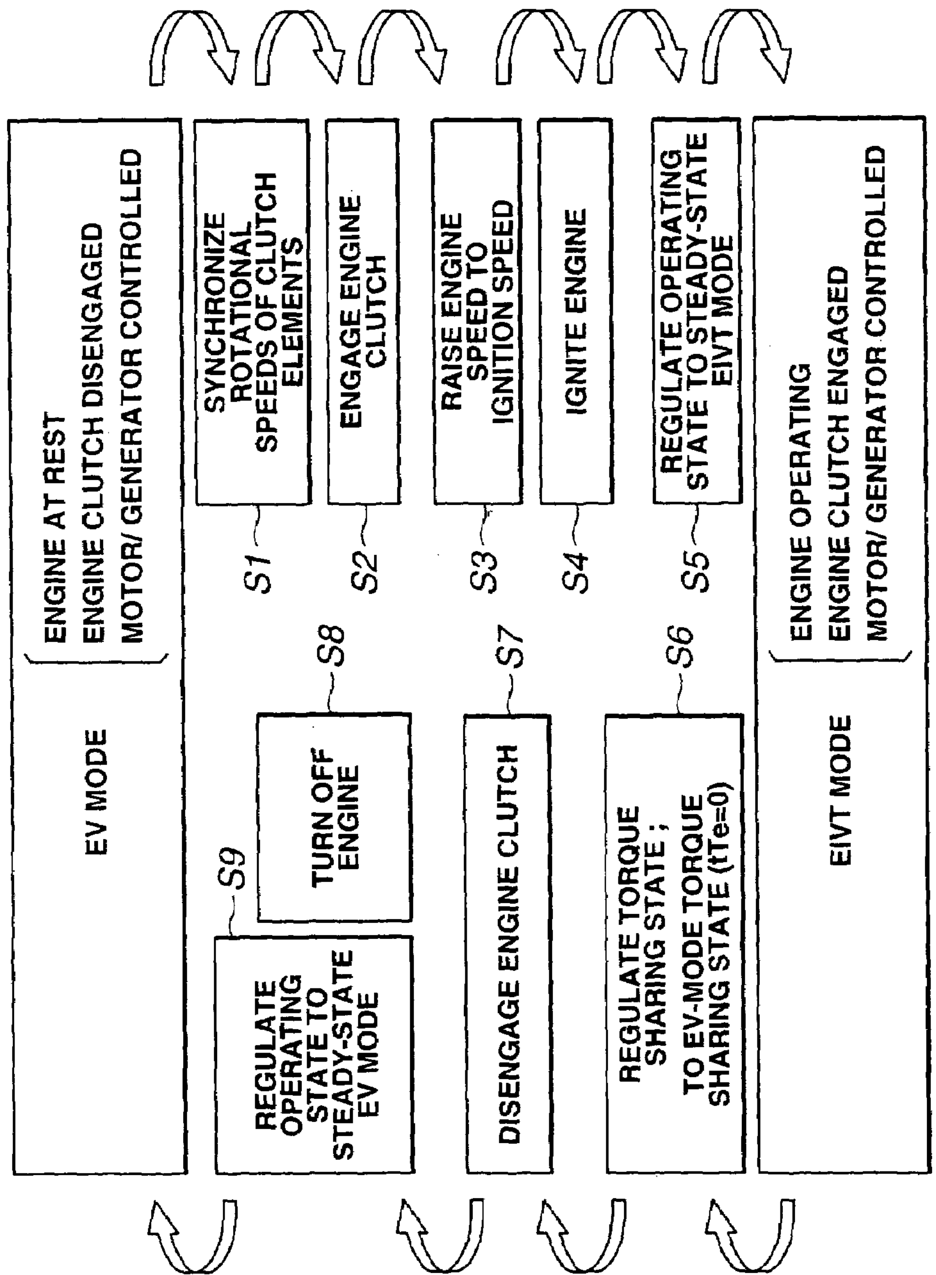
FIG.5
EV MODE
ENGINE AT REST
ENGINE CLUTCH DISENGAGED
MOTOR/ GENERATOR CONTROLLED
S1
SYNCHRONIZE ROTATIONAL SPEEDS OF CLUTCH ELEMENTS
S2
ENGAGE ENGINE CLUTCH
S3
RAISE ENGINE SPEED TO IGNITION SPEED
S4
IGNITE ENGINE
S5
REGULATE OPERATING STATE TO STEADY-STATE EIVT MODE
EIVT MODE
ENGINE OPERATING
ENGINE CLUTCH ENGAGED
MOTOR/ GENERATOR CONTROLLED
S6
REGULATE TORQUE SHARING STATE ; TO EV-MODE TORQUE SHARING STATE (tTe=0)
S7
DISENGAGE ENGINE CLUTCH
S8
TURN OFF ENGINE
S9
REGULATE OPERATING STATE TO STEADY-STATE EV MODE

HYBRID TRANSMISSION AND MODE-SHIFT CONTROL FOR HYBRID VEHICLE

BACKGROUND OF THE INVENTION

The present invention relates generally to hybrid transmissions suitable for hybrid electric vehicles (HEVs) equipped with a prime mover such as an internal combustion engine (ICE) and a motor/generator, and more particularly to a hybrid transmission including a differential mechanism between a prime mover and a motor/generator for continuously variable speed control.

In recent years, there have been disclosed various hybrid transmissions. One such hybrid transmission has been disclosed in Japanese Patent Provisional Publication No. 2003-034154. The hybrid transmission includes a two-degree-of-freedom differential mechanism including a compound planetary gearset. The rotating members of the differential mechanism are connected to a prime mover such as an ICE as an input element, a drive train as an output element, and a pair of motor/generators for continuously variable speed control. In addition, an engine clutch is disposed between the ICE and an associated one of the rotating members of the differential mechanism for selective connection therebetween. The engine clutch is disengaged during a driving mode in which the vehicle is powered by only the motor/generators. This prevents drag resistance of the ICE during the ICE being inoperative.

SUMMARY OF THE INVENTION

A hybrid transmission including an engine clutch between an engine and an associated rotating member of a differential mechanism as discussed above has a potential of causing a shift shock or uncomfortable feeling, when the driving mode is shifted with a shift of the state of an engine clutch between an engaged state and a disengaged state to change rapidly the operating state of the hybrid transmission. Similar shift shock or uncomfortable feeling may also happen during the operating state of the hybrid transmission being rapidly changed with no change of the engagement state of the engine clutch.

Accordingly, it is an object of the present invention to provide a hybrid transmission with which the driving mode can be smoothly shifted with no rapid change of the operating state of the hybrid transmission to prevent a potential shift shock and uncomfortable feeling during a mode shift including a change of the engagement state of torque transmitting mechanism such as an engine clutch and a brake, and also during other mode-shifts with no change of the engagement state of torque transmitting mechanism.

In order to accomplish the aforementioned and other objects of the present invention, a hybrid transmission for a hybrid vehicle with a plurality of motors, comprises a differential mechanism including a plurality of rotating members, the number of which is one more than the number of the motors, each connected to a respective one of the motors and a drive train, for serving for the determination of a lever state in which driving power is shared among the motors, sensors detecting the operating state of the hybrid vehicle, a power regulator for regulating the output powers of the motors, and a hybrid controller connected electrically to the sensors and the power regulator, and programmed to perform the following: determining a current driving mode and a target driving mode based on the operating state of the hybrid vehicle, determining a current lever state and a target lever state based on the operating state of the hybrid vehicle, determining a mode-shift transition process from the current lever state in the current driving mode to the target lever state in the target driving mode, in which the lever state varies continuously and smoothly, and executing the transition process with the power regulator.

According to another aspect of the invention, a hybrid transmission for a hybrid vehicle with a plurality of motors, comprises differential means for including a plurality of rotating members, the number of which is one more than the number of the motors, each connected to a respective one of the motors and a drive train, for serving for the determination of a lever state in which driving power is shared among the motors, sensing means for detecting the operating state of the hybrid vehicle, power regulating means for regulating the output powers of the motors, and control means for performing the following: determining a current driving mode and a target driving mode based on the operating state of the hybrid vehicle, determining a current lever state and a target lever state based on the operating state of the hybrid vehicle, determining a mode-shift transition process from the current lever state in the current driving mode to the target lever state in the target driving mode, in which the lever state varies continuously and smoothly, and executing the transition process with the power regulating means.

According to a further aspect of the invention, a method of controlling a hybrid transmission for a hybrid vehicle mounting thereon a plurality of motors, the method comprises determining a current driving mode and a target driving mode based on the operating state of the hybrid vehicle, determining a current lever state and a target lever state based on the operating state of the hybrid vehicle, determining a mode-shift transition process from the current lever state in the current driving mode to the target lever state in the target driving mode, in which the lever state varies continuously and smoothly, and executing the transition process.

According to a still further aspect of the invention, a method of controlling a hybrid transmission for a hybrid vehicle mounting thereon a plurality of motors, the hybrid transmission including a selectively connectable torque transmitting mechanism, the method comprises determining a current driving mode and a target driving mode based on the operating state of the hybrid vehicle, determining a current lever state and a target lever state based on the operating state of the hybrid vehicle, determining a mode-shift transition process from the current lever state in the current driving mode to the target lever state in the target driving mode, in which the lever state varies continuously and smoothly, the mode-shift transition process comprising reducing the relative rotational speed between the contact elements of the torque transmitting mechanism before engaging the torque transmitting mechanism if the mode-shift transition process includes a state shift of the torque transmitting mechanism from a disengaged state to an engaged state, and executing the mode-shift transition process.

According to another aspect of the invention, a method of controlling a hybrid transmission for a hybrid vehicle mounting thereon a plurality of motors, the hybrid transmission including a selectively connectable torque transmitting mechanism, the method comprises determining a current driving mode and a target driving mode based on the operating state of the hybrid vehicle, determining a current lever state and a target lever state based on the operating state of the hybrid vehicle, determining a mode-shift transition process from the current lever state in the current driving mode to the target lever state in the target driving mode, in which the lever state varies continuously and smoothly, the mode-shift transition process comprising decreasing torque transmitted between the contact elements of the torque transmitting mechanism before disengaging the torque transmitting mechanism if the mode shift transition process includes a state shift of the torque transmitting mechanism from an engaged state to a disengaged state, and executing the mode-shift transition process.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 3 is a block diagram depicting a functional configuration of a shift control system in accordance with the embodiment of the present invention.

FIG. 5 is a block diagram depicting a mode-transition process between EV mode and EIVT mode executed by the shift control system as shown in FIG. 3.

DETAILED DESCRIPTION OF THE INVENTION

Figure 1A:
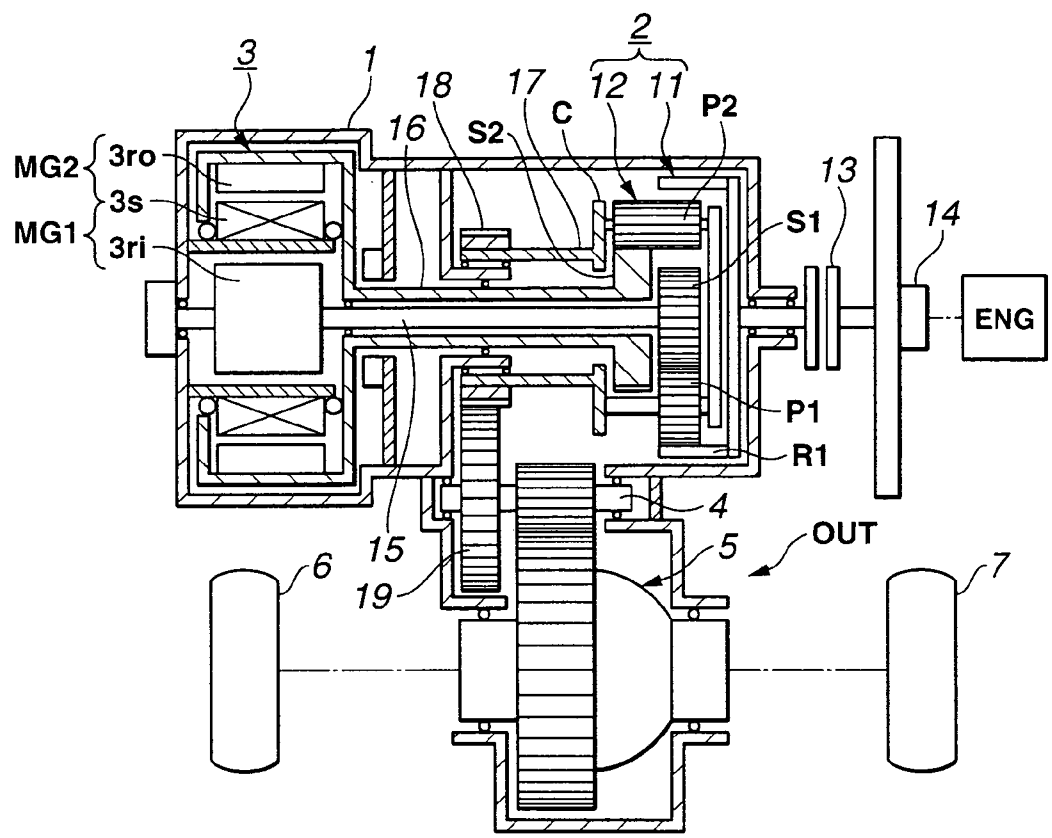
FIG. 1A is a schematic diagram depicting a hybrid transmission in accordance with an embodiment of the present invention.

Referring now to FIG. 1A, there is shown a hybrid transmission for a hybrid vehicle mounting thereon a plurality of motors in accordance with an embodiment of the present invention. In this embodiment, the hybrid transmission includes motors including an ICE and two electric motors and serves for a front transaxle of a front engine, front wheel drive vehicle (FF vehicle). The hybrid transmission includes a transmission housing 1 formed into a combination of three cylindrical shapes. In a cylinder of transmission housing 1, a Ravigneaux planetary gearset 2 is located at the right of the longitudinal axis (the horizontal direction in FIG. 1A) of the cylinder of transmission housing 1, and a compound multiphase alternating current (AC), multi-layer motor such as a compound-current double-layer motor 3 is coaxially located at the left. At the right side of Ravigneaux planetary gearset 2 and outside transmission housing 1 is located a prime mover such as an internal combustion engine ENG.

Engine ENG, Ravigneaux planetary gearset 2, and compound-current double-layer motor 3 are coaxially arranged along the prime longitudinal axis of the hybrid transmission. In addition, a countershaft 4 and a differential gear mechanism 5 are disposed in the other cylinders of transmission housing 1 the axis of which are offset from the prime longitudinal axis. Differential gear mechanism 5 is drivingly connected to drive wheels 6, 7.

Ravigneaux planetary gearset 2 is comprised of a pair of planetary gearsets including a first single-pinion planetary gearset 11 disposed closer to engine ENG, and a second double-pinion planetary gearset 12. The planetary gearsets share a ring gear R1, a planet-pinion carrier C, and a long planet pinion P2. First single-pinion planetary gearset 11 includes a first sun gear S1, ring gear R1, and planet-pinion carrier C rotatably supporting a short planet pinion P1 meshed with first sun gear S1 and ring gear R1. Second double-pinion planetary gearset 12 includes a second sun gear S2, ring gear R1, and planet-pinion carrier C rotatably supporting short planet pinion P1 meshed with ring gear R1 and long planet pinion P2 meshed with short planet pinion P1 and second sun gear S2. Thus, Ravigneaux planetary gearset 2 has essentially four major rotating members including first sun gear S1, second sun gear S2, ring gear R1, and planet-pinion carrier C. With the rotational speeds of two of the four rotating members given, the rotational speeds of the other two rotating members are determined. That is, Ravigneaux planetary gearset 2 serves for a two-degree-of-freedom differential mechanism including four rotating members. In general, a differential mechanism for a hybrid transmission includes a plurality of rotating members, the number of which is one more than the number of the motors.

The hybrid transmission includes a torque transmitting mechanism selectively connectable between one of the rotating members of the differential mechanism and an associated one of the motors for serving for the selection of the driving mode. In the shown embodiment, engine ENG is coupled to engine crankshaft 14 for power transmission. The hybrid transmission includes an engine clutch 13 disposed between ring gear R1 of Ravigneaux planetary gearset 2 and engine crankshaft 14 for selective power transmission from engine ENG to ring gear R1. On the other hand, common planet-pinion carrier C of Ravigneaux planetary gearset 2 is connected to a drive train OUT such as a differential gear unit including countershaft 4 and differential gear mechanism 5.

Compound-current double-layer motor 3 includes a pair of rotors including an inner rotor 3*ri* and an outer rotor 3*ro* of an annular shape surrounding inner rotor 3*ri* each coaxially and rotatably supported on the bottom face of transmission housing 1, and a stator 3*s* fixed with reference to transmission housing 1 and disposed in an annular space defined between inner rotor 3*ri* and outer rotor 3*ro*. Thus, stator 3*s* and inner rotor 3*ri* serve for a first motor/generator MG1, and stator 3*s* and outer rotor 3*ro* serve for a second motor/generator MG2. Motor/generators MG1, MG2 each function as a motor that during a compound current being supplied, outputs a rotation speed (including zero) in a direction according to the supplied current, or each function as a generator that during an external torque being applied, outputs a power according to a rotation speed by the external torque.

Ravigneaux planetary gearset 2 and compound-current double-layer motor 3 are connected as follows. First sun gear S1 of first single-pinion planetary gearset 11 is coupled to first motor/generator MG1 or more specifically inner rotor 3*ri*. Second sun gear S2 of second double-pinion planetary gearset 12 is coupled to second motor/generator MG2 or more specifically outer rotor 3*ro*.

Figure 1B:
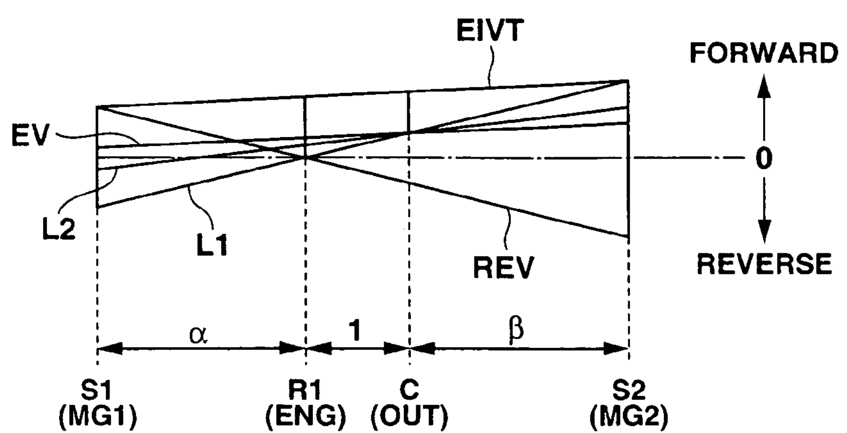
FIG. 1B is a lever diagram depicting the operating state of the hybrid transmission as shown in FIG. 1A.

As discussed above, Ravigneaux planetary gearset 2 includes four major rotating members including first sun gear S1, second sun gear S2, ring gear R1, and planet-pinion carrier C, to serve for a two-degree-of-freedom differential mechanism. Referring now to FIG. 1B, there is shown a lever diagram of the hybrid transmission. As shown in FIG. 1B, the rotational speed linearly varies in order of first sun gear S1, ring gear R1, planet-pinion carrier C, and second sun gear S2. The four rotating members of Ravigneaux planetary gearset 2, that is, first sun gear S1, ring gear R1, planet-pinion carrier C, and second sun gear S2 are coupled to first motor/generator MG1, a prime mover such as engine ENG, drive train OUT, second motor/generator MG2, respectively, which is indicated in FIG. 1B.

The following describes more specifically the structure of a corresponding lever diagram as discussed above. In FIG. 1A, ring gear R1 is connected to engine crankshaft 14 via engine clutch 13 for receiving the power from engine ENG as an input element. First sun gear S1 is coupled to first motor/generator MG1 or more specifically inner rotor 3*ri* via a shaft 15 extending along the prime longitudinal axis. Second sun gear S2 is coupled to second motor/generator MG2 or more specifically outer rotor 3*ro* via a tubular shaft 16 surrounding shaft 15. Planet-pinion carrier C is coupled to an output gear 18 via an output shaft such as a connecting member 17 as an output element. Connecting member 17 and output gear 18 are disposed between Ravigneaux planetary gearset 2 and compound-current double-layer motor 3, and rotatably supported within transmission housing 1. Output gear 18 is meshed with counter gear 19 attached to countershaft 4, so that the transmission output speed is transmitted in order of output gear 18, counter gear 19, countershaft 4, and differential gear mechanism 5. Differential gear mechanism 5 distributes rotation speed to drive wheels 6, 7. Drive train OUT is thus constructed.

The lever diagram as shown in FIG. 1B represents the operating state of the hybrid transmission as above discussed. Relative distances between the rotating members along the horizontal axis of the lever diagram are determined by gear ratios between the rotating members of first single-pinion planetary gearset 11 and second double-pinion planetary gearset 12. In the lever diagram, with the distance between ring gear R1 and planet-pinion carrier C set to 1 as a reference, the distance between first sun gear S1 and ring gear R1 is $\alpha$, and the distance between planet-pinion carrier C and second sun gear S2 is $\beta$. Positions along the vertical axis of the lever diagram indicate rotational speeds of the rotating members. The rotational speed of ring gear R1, first sun gear S1, planet-pinion carrier C, and second sun gear S2, are determined by engine speed Ne, rotational speed N1 of first motor/generator MG1, transmission output speed No, and rotational speed N2 of second motor/generator MG2. With the rotational speeds of two of the four rotating members given, the rotational speeds of the other two rotating members are determined.

Referring now to FIG. 1B, the following describes the shift control of the hybrid transmission. The hybrid transmission has three modes including EV mode and EIVT mode for forward or normal rotation output, and REV mode for backward or reverse rotation output. An operating state in EV mode is indicated by lever EV in the lever diagram. In EV mode, with engine clutch 13 disengaged, first motor/generator MG1 and second motor/generator MG2 determine and share the rotational speed and torque applied to drive train OUT, independently of engine ENG. An operating state in EIVT mode is indicated by lever EIVT in the lever diagram. In EIVT mode, with engine clutch 13 engaged, first motor/generator MG1, second motor/generator MG2, and engine ENG determine and share the rotational speed and torque applied to drive train OUT. Accordingly, the output speed for drive train OUT in EIVT mode is higher than in EV mode in general. An operating state in REV mode is indicated by lever REV in the lever diagram. In REV mode, with engine clutch 13 disengaged, at least one of first motor/generator MG1 and second motor/generator MG2 rotate in the reverse direction to share and output a reverse speed and torque to drive train OUT.

In EV mode which employs the power supplied by motor/generators MG1, MG2, torques T1, T2 and rotational speeds N1, N2 of motor/generators MG1, MG2 are derived based on transmission output torque To proportional to desired driving force F, and transmission output speed No proportional to vehicle speed VSP, from the following equations.

$$N2=\{1/(1+\alpha)\}\cdot\{-\beta\cdot N1+(1+\alpha+\beta)\cdot No\} \quad (1)$$

$$T1=\{\beta/(1+\alpha+\beta)\}\cdot To \quad (2A)$$

$$T1=\{(1+\alpha)/(1+\alpha+\beta)\}\cdot To \quad (2B)$$

In EIVT mode which employs the power supplied both by motor/generators MG1, MG2 and by engine ENG (engine torque Te, engine speed Ne), torques T1, T2 and rotational speeds N1, N2 of motor/generators MG1, MG2 are derived based on transmission output torque To, transmission output speed No, engine torque Te, and engine speed Ne, from the following equations.

$$N1=-\alpha\cdot No+(1+\alpha)\cdot Ne \quad (3A)$$

$$N1=(1+\beta)\cdot No-\beta\cdot Ne \quad (3B)$$

$$T1=\{1/(1+\alpha+\beta)\}\cdot\{\beta\cdot To-(1+\beta)\cdot Te\} \quad (4A)$$

$$T2=To-T1-Te \quad (4B)$$

Figure 2:
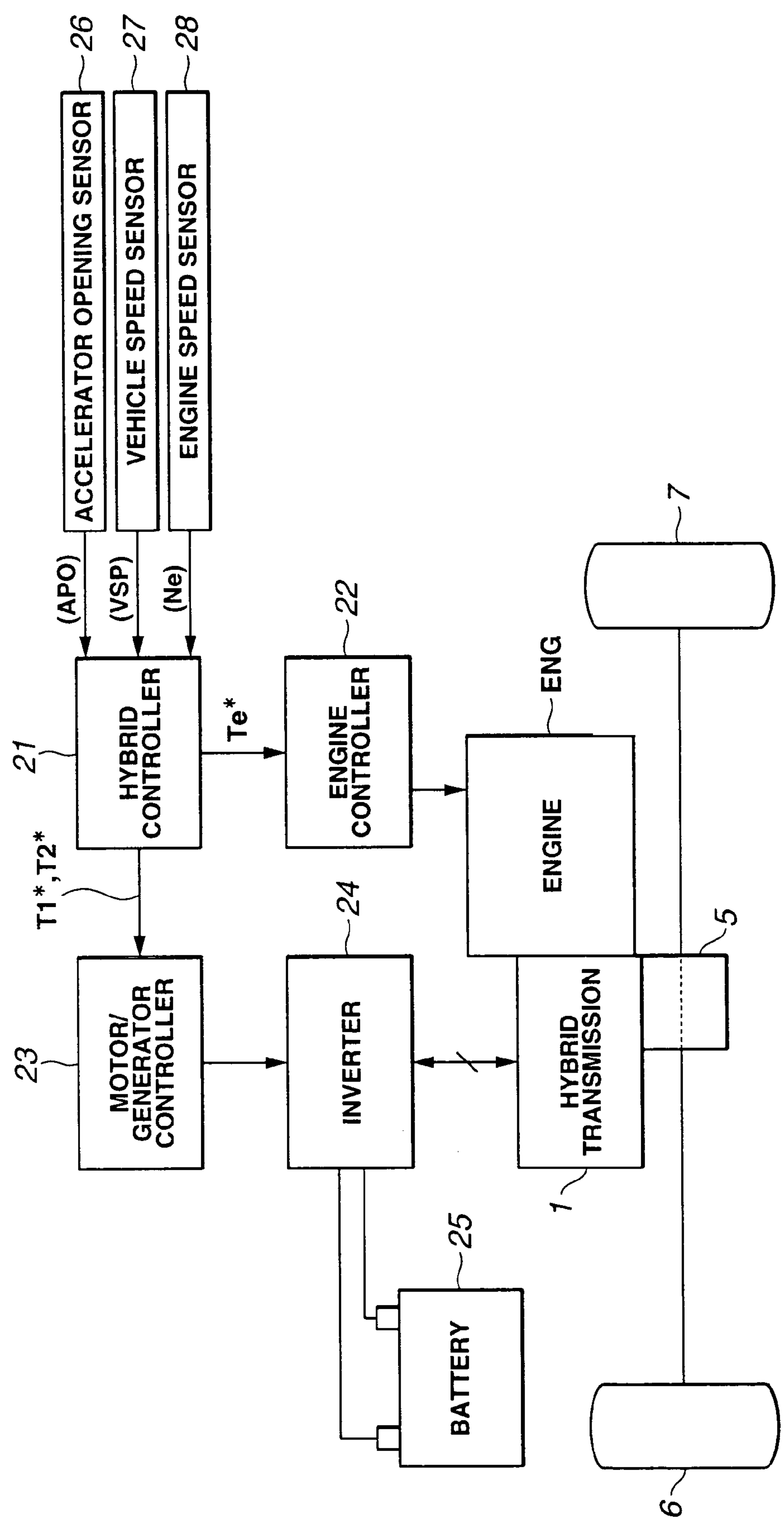
FIG. 2 is a block diagram depicting a shift control system of the hybrid transmission in accordance with the embodiment of the present invention.

Referring now to FIG. 2, there is shown a shift control system for the hybrid transmission that performs mode determination, mode shift control, and speed shift control in a mode. The driving mode is selected based on fuel economy. In the shown embodiment, fuel economy is estimated or calculated for operating states defined by a combination of desired driving force F according to driving conditions, vehicle speed VSP, and state of charge (SOC) of battery 25 or available electric power, as discussed below. The driving mode having more preferable fuel economy is selected from the two forward modes. The shift control system includes a hybrid controller 21 responsible for integral control of engine ENG and motor/generators MG1, MG2.

The output powers of the motors are regulated by a power regulator including an engine controller 22 and a motor/generator controller 23. Hybrid controller 21 issues command torque Te* and ON/OFF (engagement/disengagement) command to engine controller 22. Engine controller 22 operates engine ENG, adjusting engine torque to command torque Te*, and actuates engine clutch 13 or switches the engagement state of engine clutch 13 between ON and OFF according to the command from hybrid controller 21. In addition, hybrid controller 21 issues command torques T1*, T2* to motor controller 23. Motor controller 23 regulates an inverter 24 and battery 25 to operate motor/generators MG1, MG2, adjusting motor torques to command torques T1*, T2*. The operating state of the hybrid vehicle is detected by sensors including an accelerator opening sensor 26, a vehicle speed sensor 27, and an engine speed sensor 28. Hybrid controller 21 receives a signal of accelerator opening APO detected based on a depressed amount of accelerator pedal by accelerator opening sensor 26, a signal of vehicle speed VSP proportional to transmission output speed No detected by vehicle speed sensor 27, and a signal of engine speed Ne detected by engine speed sensor 28. Thus, hybrid controller 21 is connected electrically to the sensors and the power regulator for shift control of the hybrid transmission.

Referring now to FIG. 3, there is shown a block diagram depicting the functional configuration of the shift control system including hybrid controller 21. Hybrid controller 21 includes a desired driving-torque determining section 31, a SOC determining section 32, a mode-selecting section 33, a mode-shift control section 36, a target lever-state determining section 40, and a lever control section 41.

Figure 4:
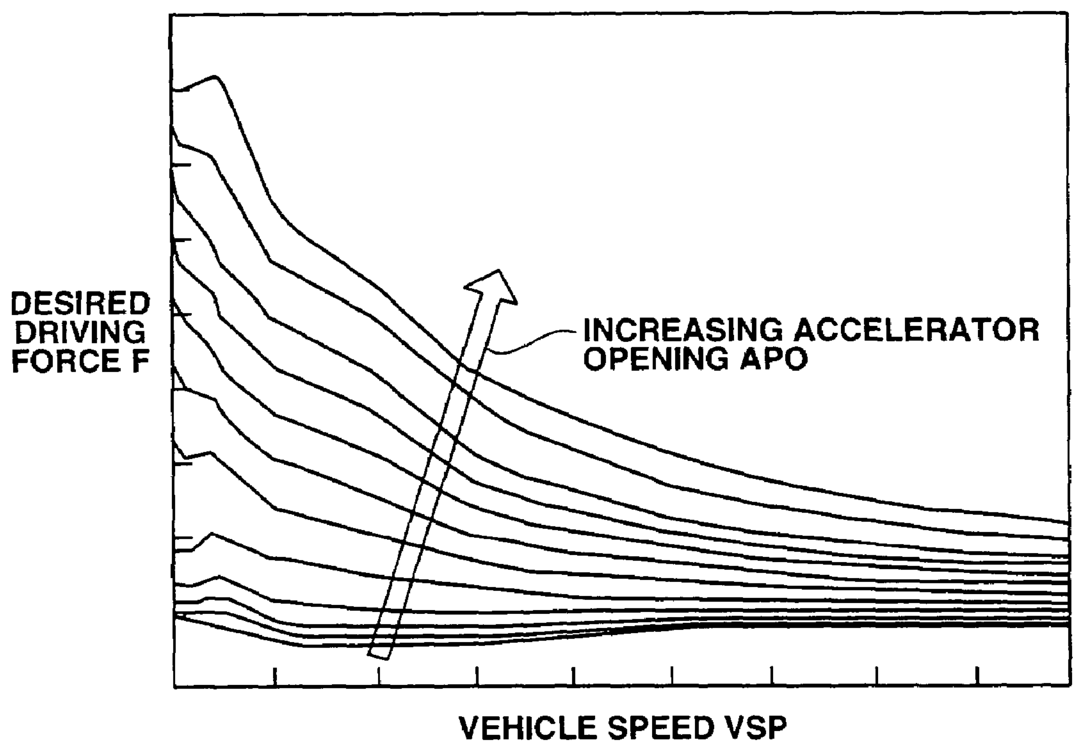
FIG. 4 is a profile map for deriving a desired driving force F based on a vehicle speed VSP and an accelerator opening APO in accordance with the embodiment of the present invention.

Desired driving torque determining section 31 derives desired driving force F based on a combination of accelerator opening APO and vehicle speed VSP from a predetermined profile map as shown in FIG. 4. SOC determining section 32 estimates or determines the SOC of battery 25 or the available amount of electricity the consumption of which causes no serious damage in battery 25.

Mode-selecting section 33 includes a preferable fuel economy mode selecting section 34 and a command determining section 35. Preferable fuel economy mode selecting section 34 selects a driving mode preferable for fuel economy, based on a combination of desired driving force F and vehicle speed VSP, in consideration of the SOC of battery 25. That is, preferable fuel economy mode selecting section 34 estimates fuel economy of each driving mode for each operating state defined by desired driving force F, vehicle speed VSP, and the SOC of battery 25, selects the driving mode having more preferable fuel economy from the two forward driving modes, and outputs the selected mode as a preferable mode.

Command determining section 35 includes an EV-mode command determining section 35*a* and an EIVT-mode command determining section 35*b*. EV-mode command determining section 35*a* determines a target operating state in EV mode, that is, a target lever state such as the lever indicated by EV in FIG. 1B, if preferable fuel economy mode selecting section 34 selects EV mode. Actually, EV-mode command determining section 35*a* derives target rotational speed tN1 of first motor/generator MG1 based on desired driving force F, vehicle speed VSP, and the SOC of battery 25 from a predetermined three-variable map for EV mode. Target rotational speed tN2 of second motor/generator MG2 is calculated based on target rotational speed tN1 and vehicle speed VSP or transmission output speed No from the equation (1). Target torques tT1, tT2 of motor/generators MG1, MG2 are each calculated based on desired driving force F or transmission output torque To from a respective one of the equations (2A) and (2B). Incidentally, as a matter of course, target engine torque tTe is set to zero, because EV mode employs no engine power.

EIVT-mode command determining section 35*b* determines a target operating state in EIVT mode, that is, a target lever state such as the lever indicated by EIVT in FIG. 1B, if preferable fuel economy mode selecting section 34 selects EIVT mode. Actually, EIVT-mode command determining section 35*b* derives target engine torque tTe and target engine speed tNe of engine ENG based on desired driving force F, vehicle speed VSP, and the SOC of battery 25 from a predetermined three-variable map for EIVT mode. Target rotational speeds tN1, tN2 of motor/generators MG1, MG2 are calculated based on target engine speed tNe and vehicle speed VSP or transmission output speed No from the equations (3A) and (3B). Target torque tT1 of motor/generator MG1 is calculated based on target engine torque tTe and desired driving force F or transmission output torque To from the equation (4A). Target torque tT2 is calculated based on target engine torque tTe, target torque tT1, and desired driving force F or transmission output torque To from the equation (4B).

Mode-shifting control section 36 includes a starting-point mode determining section 37, an endpoint-mode determining section 38, and a mode-transition control section 39. Starting-point mode determining section 37 determines a starting-point mode according to a current mode selected, and then issues a corresponding mode indicative signal to target lever state determining section 40 and lever control section 41. First, endpoint-mode determining section 38 determines whether or not the preferable mode determined by preferable fuel economy mode selecting section 34 is actually available. When the preferable mode is unavailable, endpoint-mode determining section 38 sets an endpoint mode to the current mode. On the other hand, when the preferable mode is available, endpoint-mode determining section 38 sets the endpoint mode to the preferable mode. Then, endpoint mode determining section 38 issues a corresponding mode indicative signal to target lever state determining section 40 and lever control section 41.

Mode-transition control section, 39 compares the starting-point mode (current mode) determined by starting-point mode determining section 37 with the endpoint mode (target mode) determined by endpoint mode determining section 38. When the two modes are same, mode-transition control section 39 issues to target lever state determining section 40 and lever control section 41 a transition command indicating no need for mode shift. On the other hand, when the two modes are different, mode-transition control section 39 issues to target lever state determining section 40 and lever control section 41 a transition command indicating mode shift. When the shift control includes no mode shift, target lever state determining section 40 and lever control section 41 set command torque Te* and command torques T1*, T2* to target engine torque tTe and target torques tT1, tT2, respectively, supplied from an associated one of EV-mode command determining section 35*a* and EIVT-mode command determining section 35*b* corresponding to the current mode. Then, mode-transition control section 39 issues commands to engine controller 22 and motor controller 23. Incidentally, the engagement state of engine clutch 13 is unchanged during this operation.

Referring now to FIG. 5, the following describes a shift control including a mode transition process in accordance with the mode-transition indicative command issued by endpoint-mode determining section 38. Mode-transition control section 39 issues corresponding transition commands to execute the shift control. First, in the following case, the starting-point mode is EV mode and the endpoint mode is EIVT mode. That is, the driving mode is shifted from EV mode to EIVT mode in the following process.

First, at step S1, the lever state, which is defined by a combination of first motor/generator MG1 and second motor/generator MG2, is regulated to synchronize or reduce the relative rotational speed between the contact elements of engine clutch 13 to zero. With the rotational speed and torque of drive train OUT unchanged, a current operating state such as lever EV in FIG. 1B is shifted to an operating state as lever L1 where the rotational speed of the contact element on the side close to ring gear R1 is equal to zero. The shift of operating state is executed smoothly and continuously. That is, variables, such as a rotational speed and a torque, of each rotating element of the hybrid transmission is varied with no rapid change.

At step S2, engine clutch 13 is engaged. The state of engine clutch 13 is shifted from a disengaged state to an engaged state, at the moment the rotational speed of the contact element on the side close to ring gear R1 or the speed difference at engine clutch 13 is brought to be equal to or smaller than a predetermined threshold speed close to zero through step S1. Engaging engine clutch 13 in this manner reduces a potential shock caused by clutch engagement.

At step S3, the engine speed is raised to a predetermined ignition speed suitable for stable ignition of the engine. The operating state is shifted from the state such as lever L1 to a state such as lever L2, with the rotational speed and torque of drive train OUT unchanged. This shift is executed smoothly and continuously through a predetermined transition process.

At step S4, engine ENG is injected with fuel and ignited. The ignition of engine ENG is executed at the moment the rotational speed of engine ENG is raised to the ignition speed. Thus, engine ENG is brought into an operating condition.

At step S5, the operating state is regulated to a steady operating state in EIVT from the operating state indicated by lever L2. This shift is executed smoothly and continuously through a predetermined transition process.

Mode-transition control section 39 issues commands corresponding to the mode transition process of steps S1 through S5, to target lever state determining section 40 and lever control section 41. Target lever state determining section 40 determines target engine torque tTe, target engine speed tNe, and target output torque tTo, and outputs a target operating state to lever control section 41, to carry out the transition commands. Lever control section 41 determines command torque Te* for engine controller 22, and command torques T1*, T2* for motor controller 23, based on a predetermined control law such as the following equation (5).

$$Te^* = tTe \tag{5}$$

$$\begin{bmatrix} T1^* \\ T2^* \end{bmatrix} = \begin{bmatrix} 1, & 1 \\ 1+\alpha, & -\beta \end{bmatrix}^{-1} \begin{bmatrix} tTo - tTe \\ OP - tTe \end{bmatrix}$$

$$OP = Kp \cdot \{1 + (1/tTe) \cdot s^{-1} + tTo - s\} \cdot (tNe - Ne)$$

where s represents the Laplace variable, and Kp represents a gain.

As discussed above, the lever state in FIG. 1B is varied smoothly and continuously through a predetermined transition process. That is, the rotational speeds of the rotating members are regulated from a current lever state such as lever EV in EV mode to a target lever state such as lever EIVT in EIVT mode, through the lever states L1 and L2. This prevents a potential shift shock and uncomfortable feeling during a mode shift including a change of the engagement state of torque transmitting mechanism such as an engine clutch and a brake, and also during other mode-shifts with no change of the engagement state of torque transmitting mechanism, because the transition process causes no rapid change of the operating state of the hybrid transmission.

As discussed above, the lever state, which is defined by a combination of first motor/generator MG1 and second motor/generator MG2, is regulated, to synchronize or reduce the relative rotational speed between, the contact elements of engine clutch 13 to zero. With the rotational speed and torque of drive train OUT unchanged, a current operating state such as lever EV in FIG. 1B is shifted to an operating state as lever L1 where the rotational speed of the contact element on the side close to ring gear R1 is equal to zero. The shift of operating state is executed smoothly and continuously. Then, the state of engine clutch 13 is shifted from a disengaged state to an engaged state, at the moment the rotational speed of the contact element on the side close to ring gear R1 or the speed difference at engine clutch 13 is brought to be equal to or smaller than a predetermined threshold speed close to zero. Engaging engine clutch 13 in this manner reduces a potential engagement shock caused by engine clutch 13.

After engagement of engine clutch 13, the engine speed is raised to the ignition speed. The operating state is shifted from the lever state L1 to L2 with output speed and torque unchanged. This shift is executed smoothly and continuously through a predetermined transition. Then, the ignition of engine ENG is executed at the moment the rotational speed of engine ENG is raised to the ignition speed. This ensures the ignition of engine ENG, to allow a following reliable transition to a steady operating state in EIVT mode.

In addition to the previously discussed mode transition process, at the moment the rotational speed of ring gear R1 or the speed difference at engine clutch 13 is brought to be equal to or smaller than a predetermined threshold speed close to zero, the change of rotational speed or the rotational acceleration of the rotating members may be reduced. This prevents more reliably a potential engagement shock caused by engine clutch 13.

Through the transition process of steps S1 through S5, a combination of a variable speed command set and a constant torque command set may be applied to the motors, which allows a mode-shift with no change in driving torque.

Next, referring now to FIG. 5, the following describes a shift control including the mode transition process inverted from the previously discussed process. In the following case, the starting-point mode is EIVT mode and the endpoint mode is EV mode. That is, the driving mode is shifted from EIVT mode to EV mode in the following process.

First, at step S6, target engine torque tTe is set to zero, in which the operating state of engine ENG is same as in EV mode. That is, torque transmitted between the contact elements of engine clutch 13 is decreased. With the rotational speed and torque of drive train OUT unchanged, a current operating state such as lever EIVT in FIG. 1B is shifted to an operating state such as lever L1 where target engine torque tTe is equal to zero. Thus, the state of torque sharing among the motors is regulated to an EV-mode torque sharing state. This shift of operating state is executed smoothly and continuously through a predetermined transition process.

At step S7, engine clutch 13 is disengaged. The state of engine clutch is shifted from an engaged state to a disengaged state, at the moment target engine torque tTe is brought to be zero, that is, at the moment the transmitted torque of engine clutch 13 is equal to zero. Disengaging engine clutch 13 in this manner reduces a shock caused by clutch disengagement.

At step S8, engine ENG is turned off to be at rest. Then, at step S9, the operating state is shifted from the state of lever L1 to the state of lever EV with the rotational speed and torque of drive train OUT unchanged. This shift is executed smoothly and continuously through a predetermined transition process.

Mode-transition control section 39 issues commands corresponding to the mode transition process of steps S6 through S9, to target lever state determining section 40 and lever control section 41. target lever state determining section 40 determines target engine torque tTe, target engine speed tNe, and target output torque tTo, and outputs a target operating state to lever control section 41, to carry out the transition commands. Lever control section 41 determines command torque Te* for engine controller 22, and command torques T1*, T2* for motor controller 23, based on a predetermined control law such as the equation (5), as in the case of EV-EIVT mode shift.

As discussed above, the lever state in FIG. 1B is varied smoothly and continuously. That is, the rotational speeds of the rotating members are varied from a current lever state such as lever EIVT in EIVT mode to a target lever state such as lever EV in EV mode, through the lever state L1. This prevents a potential shift shock and uncomfortable feeling during a mode shift including a change of the engagement state of torque transmitting mechanism such as an engine clutch and a brake, and also during other mode-shifts with no change of the engagement state of torque transmitting mechanism, because the transition process causes no rapid change of the operating state of the hybrid transmission.

As discussed above, with the rotational speed and torque of drive train OUT unchanged, a current operating state such as lever EIVT in FIG. 1B is shifted to an operating state such as lever L1 where target engine torque tTe is equal to zero. This shift of operating state is executed smoothly and continuously through a predetermined transition process. The state of engine clutch is shifted from an engaged state to a disengaged state, at the moment target engine torque tTe is brought to be zero, that is, at the moment the transmitted torque of engine clutch 13 is equal to zero. Disengaging engine clutch 13 in this manner reduces a shock caused by clutch disengagement. In addition, just after disengaging engine clutch 13, engine ENG is brought to be at rest by discontinuing fuel injection and ignition. This prevents a potential vibration caused by turning off the engine.

In addition to the previously discussed mode transition process, at the moment target engine torque tTe is brought to be zero, that is, at the moment the transmitted torque of engine clutch 13 is equal to zero, the rate of change of the transmitted torque of engine clutch 13 may be reduced before disengaging engine clutch 13. This prevents more reliably a potential disengagement shock caused by engine clutch 13.

Mode-shift control including engagement or disengagement of engine clutch 13 is executed, as discussed above. A hybrid transmission in accordance with another embodiment of the present invention may include another mechanical structure. For example, a hybrid transmission may have a mechanical structure including another torque transmitting mechanism such as a brake for fixing one of the rotating members. Such a brake has a potential of causing shift shock and uncomfortable feeling, as in the case of engine clutch 13. As a matter of course, a mode shift including a state shift of the brake may be controlled as above discussed, which produces similar effects.

In the shown embodiment, speed shift control including engagement or disengagement of a torque transmitting mechanism such as a clutch and a brake are discussed. However, simple switching from a current mode (starting-point mode) to a target mode (endpoint mode) with no change in the state of the torque transmitting mechanism also has a potential of causing shift shock and uncomfortable feeling. Accordingly, the mode-shift control including a transition phase that gradually varies the driving mode from a current mode to a target mode may be applied to such cases, which provides similar effects.

This application is based on a prior Japanese Patent Application No. 2003-203628 filed Jul. 30, 2003. The entire contents of Japanese Patent Applications No. 2003-203628 are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hybrid transmission for a hybrid vehicle with a plurality of motors, the motors including at least a prime mover and two motor/generators, the hybrid transmission comprising:

- a differential mechanism including a plurality of rotating members, the number of which is one more than the number of the motors, each rotating member connected to a respective one of the motors and a drive train, for a determination of a lever state in which driving power is shared among the motors;
- sensors for detecting an operating state of the hybrid vehicle;
- a power regulator for regulating output powers of the motors; and
- a hybrid controller connected electrically to the sensors and the power regulator, and programmed to perform the following:
  - operating the hybrid vehicle at least in a first driving mode in which the driving power is implemented by all of the prime mover and the two motor/generators, and in a second driving mode in which the driving power is implemented only by the two motor/generators;
  - determining a current driving mode as one of the first and second driving modes and a target driving mode as the other of the first and second driving modes based on the operating state of the hybrid vehicle;
  - determining a current lever state and a target lever state based on the operating state of the hybrid vehicle;
  - determining, when there is a difference between the current lever state and the target lever state, a mode-shift transition process from the current lever state in the current driving mode to the target lever state in the target driving mode, in which the lever state varies continuously and smoothly; and
  - executing the transition process with the power regulator.

2. The hybrid transmission as claimed in claim 1, further comprising a torque transmitting mechanism selectively connectable between one of the rotating members of the differential mechanism and an associated one of the motors and actuated by the power regulator, for a selection of a driving mode, wherein the hybrid controller is programmed to perform the following:

- reducing a relative rotational speed between contact elements of the torque transmitting mechanism before engaging the torque transmitting mechanism if the mode-shift transition process includes a state shift of the torque transmitting mechanism from a disengaged state to an engaged state.

3. The hybrid transmission as claimed in claim 2, wherein the hybrid controller is programmed to perform the following:

- shifting an engagement state of the torque transmitting mechanism from a disengaged state to an engaged state when the relative rotational speed between the contact elements of the torque transmitting mechanism is equal to or smaller than a predetermined threshold speed.

4. The hybrid transmission as claimed in claim 3, wherein the hybrid controller is programmed to perform the following:

reducing a relative rotational acceleration between the contact elements of the torque transmitting mechanism before engaging the torque transmitting mechanism.

5. The hybrid transmission as claimed in claim 1, further comprising a torque transmitting mechanism selectively connectable between one of the rotating members of the differential mechanism and an associated one of the motors and actuated by the power regulator, for a selection of a driving mode, wherein the hybrid controller is programmed to perform the following:

decreasing torque transmitted between contact elements of the torque transmitting mechanism before disengaging the torque transmitting mechanism if the mode-shift transition process includes a state shift of the torque transmitting mechanism from an engaged state to a disengaged state.

6. The hybrid transmission as claimed in claim 5, wherein the hybrid controller is programmed to perform the following:

shifting an engagement state of the torque transmitting mechanism from an engaged state to a disengaged state when the transmitted torque between the contact elements of the torque transmitting mechanism is equal to or smaller than a predetermined threshold torque.

7. The hybrid transmission as claimed in claim 6, wherein the hybrid controller is programmed to perform the following:

reducing a rate of change of the transmitted torque before disengaging the torque transmitting mechanism.

8. The hybrid transmission as claimed in claim 1, further comprising a torque transmitting mechanism selectively connectable between one of the rotating members of the differential mechanism and an associated one of the motors and actuated by the power regulator, for a selection of a driving mode, wherein the hybrid controller is programmed to perform the following:

reducing a relative rotational speed between contact elements of the torque transmitting mechanism before engaging the torque transmitting mechanism if the mode-shift transition process includes a state shift of the torque transmitting mechanism from a disengaged state to an engaged state;

shifting an engagement state of the torque transmitting mechanism from a disengaged state to an engaged state when the relative rotational speed between the contact elements of the torque transmitting mechanism is equal to or smaller than a predetermined threshold speed;

reducing a relative rotational acceleration between the contact elements of the, torque transmitting mechanism before engaging the torque transmitting mechanism;

decreasing torque transmitted between the contact elements of the torque transmitting mechanism before disengaging the torque transmitting mechanism if the mode-shift transition process includes a state shift of the torque transmitting mechanism from an engaged state to a disengaged state;

shifting the engagement state of the torque transmitting mechanism from an engaged state to a disengaged state when the transmitted torque between the contact elements of the torque transmitting mechanism is equal to or smaller than a predetermined threshold torque; and reducing a rate of change of the transmitted torque before disengaging the torque transmitting mechanism.

9. The hybrid transmission as claimed in claim 1, wherein the mode-shift transition process includes a first part in which the lever state varies from the current lever state to an intermediate lever state which enables a smooth mode-shift from the current driving mode to the target driving mode and a second part in which the lever state varies from the intermediate lever state to the target lever state.

10. A hybrid transmission for a hybrid vehicle with a plurality of motors, the motors including at least a prime mover and two motor/generators, the hybrid transmission comprising:

means for including a plurality of rotating members, the number of which is one more than the number of the motors, each rotating member connected to a respective one of the motors and a drive train, for a determination of a lever state in which driving power is shared among the motors;

sensing means for detecting an operating state of the hybrid vehicle;

power regulating means for regulating output powers of the motors; and control means for performing the following:

operating the hybrid vehicle at least in a first driving mode in which the driving power is implemented by all of the prime mover and the two motor/generators, and in a second driving mode in which the driving power is implemented only by the two motor/generators;

determining a current driving mode as one of the first and second driving modes and a target driving mode as the other of the first and second driving modes based on the operating state of the hybrid vehicle;

determining a current lever state and a target lever state based on the operating state of the hybrid vehicle;

determining, when there is a difference between the current lever state and the target lever state, a mode-shift transition process from the current lever state in the current driving mode to the target lever state in the target driving mode, in which the lever state varies continuously and smoothly; and executing the transition process with the power regulating means.

* * * * *